United States Patent [19]

Speedie

[11] 4,320,557
[45] Mar. 23, 1982

[54] TUBE CLAMP
[75] Inventor: Robert Speedie, Frankston, Australia
[73] Assignee: Illinois Tool Works Inc., Chicago, Ill.
[21] Appl. No.: 217,921
[22] Filed: Dec. 18, 1980
[30] Foreign Application Priority Data
Dec. 21, 1979 [AU] Australia ............................. PE1823
[51] Int. Cl.³ .............................................. A22B 5/14
[52] U.S. Cl. .................................................... 17/1 R
[58] Field of Search ............... 17/1 R, 1 S, 43; 24/18, 24/115 M, 260

[56] References Cited
U.S. PATENT DOCUMENTS

2,505,964  5/1950  Hincks ................................... 17/1 R
3,156,005  11/1964  Thompson ............................ 17/1 R

FOREIGN PATENT DOCUMENTS

609780  2/1935  Fed. Rep. of Germany ....... 17/1 R

Primary Examiner—Willie G. Abercrombie
Attorney, Agent, or Firm—J. R. Halvorsen; T. W. Buckman

[57] ABSTRACT

The invention relates to a tube clamp, such as a weasand clamp, wherein there are means for locking the clamp in its closed position. The clamp comprises a quasi-tubular member having in its side wall a slot extending from one end of the clamp to the other, so that the clamp may be fitted to a flexible tube at a position between its opposite ends. Within the tubular member is a hinged flap adapted to press upon the flexible tube, and close it, when there is pressure to move the clamp rearwardly, the hinged flap being arranged to permit the clamp to be moved forwardly. Molded integrally with the clamp is a flexible strap having at about its free end a stud or bead which is engageable in a recess or opening provided in the outer wall of the clamp so as to thereby hold the clamp from inadvertent removal from the tube once it has been fitted in position.

10 Claims, 6 Drawing Figures

U.S. Patent  Mar. 23, 1982  4,320,557
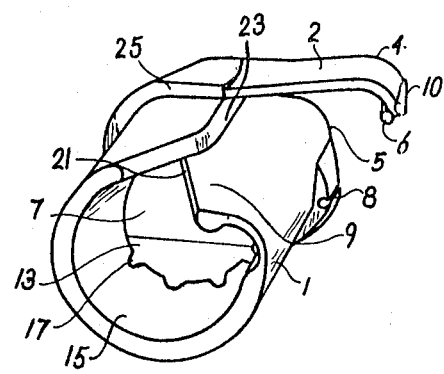
FIG.1
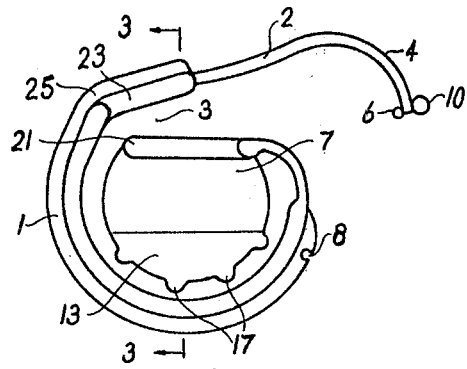
FIG.2
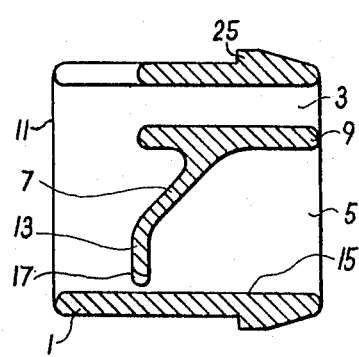
FIG.3
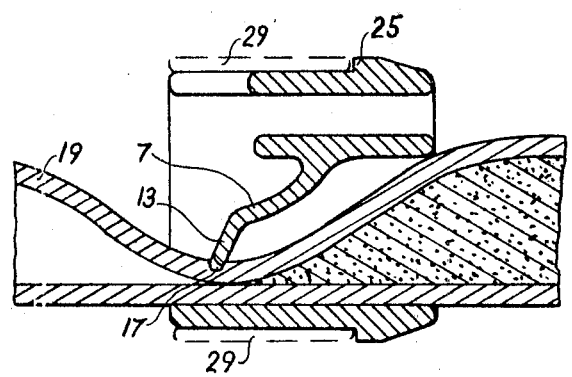
FIG.4
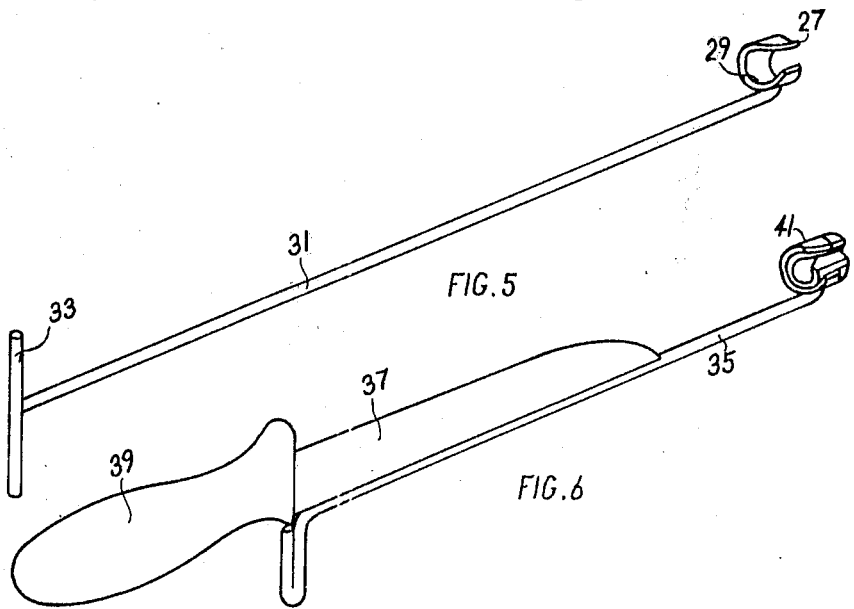
FIG.5
FIG.6

TUBE CLAMP

The present invention relates to a tube clamp and it refers particularly but not exclusively to a tube clamp for closing off the weasand of an animal—as a sheep or a bovine animal—after it has been slaughtered.

It has been a problem in the slaughtering of animals that the weasand should be closed off to prevent the contents of the stomach spilling onto the carcass and spoiling the meat. For some time past it was the practice to close off the weasand by tying an elasticised cord around it. This practice proved to be time consuming and susceptible to contamination in that the stomach contents collected at the lower end of the weasand (the animal being inverted) and caused a rupturing of the weasand with consequent spilling of the stomach contents on to the carcass.

One development to overcome this disadvantage consists of a plastics moulded clip, as described in our Australian patent application No. 45727/79 filed Apr. 2, 1979, capable of being applied to the weasand and of being pushed along the weasand until in a position close to the junction of the weasand and the stomach.

However, with this construction there is always the possibility of the clip becoming detached from the weasand, and the consequent unclamping of the weasand and consequent spillage of stomach contents onto the carcass.

Accordingly, it is an object of the invention to provide a clamp which may be readily applied to the weasand and then locked against inadvertent removal therefrom.

Another object of the invention is to provide a lockable tube clamp which may be readily slid along the tube so as to clamp the tube at a desired location remote from the point of application. A further object is to provide a clamp for a tube, such as a weasand, which may be readily applied to the tube at a position intermediate of its length, locked so as to remain in a closed position and then slid along the tube by a suitable hand tool so as to clamp the tube closed at a location remote from the point of application.

According to the present invention there is provided a tube clamp for closing or substantially closing a flexible tube, such as the weasand of an animal, including a tubular or quasi-tubular member having a slot extending through the side wall from one end to the other so as to enable the clamp to be applied to a tube to be closed at a position intermediate of its length, a hinged flap within the tubular member, the hinged flap being adapted to press the tube between the edge of the flap and the inside wall of the tubular member so as to permit the tubular member to be moved in one direction along the tube but upon pressure applied in the opposite direction to clamp the tube and effect at least a substantial closure of the tube, and means for locking the clamp against inadvertent release of the tubular member from its engagement with the tube.

In order that the invention may be readily understood and conveniently put into practical form we shall now describe, with reference to the accompanying illustrative drawings, one particular construction of tube clamp made according to this invention. In these drawings:

FIG. 1 is a perspective view of the tube clamp from the rear end;

FIG. 2 is a rear end view;

FIG. 3 shows a longitudinal cross-section on the line and in the direction of the arrows 3—3 of FIG. 2;

FIG. 4 illustrates the manner of use of the clamp; and

FIGS. 5 and 6 depict two different tools for use in moving the clamp along the weasand towards the stomach.

The particular construction of tube clamp made according to the invention, and as illustrated in the attached drawings, is basically the same as described and illustrated in our Australian patent application No. 45727/79. There is a quasi-tubular member 1 with a longitudinal opening 3 in its side wall. At a first or front end 5 of the tubular member 1, at one side of opening 3, is an integral hinged flap 7 of relatively thin material, somewhat more flexible than the major part of the tubular member 1. The flap 7 is joined to a side-wall part 9 which, by reason of its connection through the hinged flap, can move as a gate relative to the remainder of the tubular member 1. The hinged flap 7 is inclined towards the second or rear end 11 of the tubular member for a substantial part of its length and is of such a size as to fit within the tubular member 1 and permit inward swinging movement of the side-wall part 9. The hinged flap 7 as viewed in FIG. 2 is substantially the same shape as the interior of the tubular member. A part 13 of the free end of the hinged flap is angled towards the inner wall 15 to be normal thereto, to increase the force applied by the flap 7 when deflected from its rest position. Projections 17 on the outer periphery of the part 13 enable additional gripping of the weasand 19.

The outer or free longitudinal edge 21 of the side wall part 9 is overlapped by the opposite longitudinal edge 23 of the remainder of the tubular member 1 so that the outward swinging movement of the side-wall part 9 is restricted. The two longitudinal edges 21 and 23 are divergent, and at the end 5 of the tubular member the two edges are spaced apart a short distance.

At or near the end 5 the tubular member 1 is an external shoulder or rib 25, for engagement by a rodding tool 27 for moving the tubular member along the weasand tube 19.

A suitable rodding tool 27 shown in FIG. 5 has a ring member 29 for retaining the clamp. The ring member 29 is attached at one end to an elongated member 31 having a handle 33 at the other end. The clamp is inserted into the ring member with the rib 25 abutting the ring member to prevent movement of the clamp when being placed on and moved along the weasand 19.

Alternatively, there may be provided a rodding attachment on the back of the blade 37 of a knife 39 as shown in FIG. 6. The attachment comprises a metal rod 35 with a ring 41 for receiving a clamp as described above. The ring 41 is a short distance in advance of the tip of the blade and the attachment is welded to the back of the blade 37.

According to the invention there is provided a strap 2 as an integral part of the front part of the tubular member 1, extending outwardly of the longitudinal edge 23 as a continuation of the external shoulder 25. The strap is curved at its outer end part 4 so that when the strap is pressed towards the outer surface of the tubular member 1 its outer end part will press firmly upon the external shoulder 25.

At the outer end of the strap 2, on the underside, is a bead 6 adapted to engage in a longitudinal recess 8 provided in the shoulder 25. There is also a small fingerpiece 10 at the end of the strap, to facilitate its disengagement from that recess. When the clamp has been engaged on the weasand 19 the strap 2 is flexed to enable the bead 6 to be pressed into the longitudinal recess 8 to lock the tubular member on the weasand.

Thus the clamp may be readily fitted to the weasand, locked in position and then moved along the weasand into appropriate position adjacent the stomach without any real likelihood of the clamp becoming dislodged, and the stomach contents discharging through the weasand.

The clamp may be made of a suitable plastics material such as acetyl or a polyamide.

It is to be understood that the strap locking means may be incorporated in other designs of weasand clip, and that modifications in details of design and construction may be made without departing from the ambit of the invention the nature of which is to be ascertained from the appended claims, and that the clamp may be applied for purposes other than clamping weasands.

I claim:

1. A tube clamp for substantially closing a flexible tube, including a quasi-tubular member having a slot extending through the side wall from one end to the other so as to enable the quasi-tubular member to be applied to a tube at a position between the ends of the tube and means in the quasi-tubular member for applying a clamping pressure upon portion of the tube within the clamp and means for locking the clamp against inadvertent release from the flexible tube.

2. A tube clamp as claimed in claim 1 wherein the means for locking the clamp against inadvertent release consist of a flexible strap made integrally with and extending outwardly of one edge of the slot, and a recess in the outer side wall of the clamp, said strap having at about its outer end a bead engageable in the recess so as to hold the strap in closed position.

3. A tube clamp as claimed in claim 2 wherein the strap has in the outer surface of its outer end a bead to enable the locking means to be disengaged.

4. A tube clamp as claimed in claim 1 wherein the quasi-tubular member has within it a hinged flap adapted to press the tube between the edge of the flap and the inside wall of the tubular member.

5. A tube clamp as claimed in claim 4 wherein the slot is formed by a gap between the overlapped edges of a quasi-tubular wall member.

6. A tube clamp as claimed in claim 5 wherein the hinged flap is attached to the inner wall surface of the inner overlapped edge and is inclined towards one end of the member.

7. A tube clamp as claimed in claim 6 wherein a part of the free end of the inclined hinged flap is substantially normal to the inner wall surface of the tube clamp.

8. A tube clamp as claimed in claim 6 or 7 wherein the free end of the hinged flap has at least one projection thereon.

9. A tube clamp as claimed in claim 1 wherein an external projection is provided for engagement by a holding tool.

10. A tube clamp as claimed in claim 1 wherein the tube clamp is formed from a plastics material.

* * * * *